United States Patent
Penazzi

(10) Patent No.: US 10,780,615 B2
(45) Date of Patent: Sep. 22, 2020

(54) PUNCH FOR COMPRESSION MOLDS

(71) Applicant: SACMI COOPERATIVA MECCANICI IMOLA SOCIETA' COOPERATIVA, Imola (IT)

(72) Inventor: Davide Penazzi, Imola (IT)

(73) Assignee: SACMI Cooperativa Meccanici Imola Societa' Cooperativa (IT)

(*) Notice: Subject to any disclaimer, the term of this patent is extended or adjusted under 35 U.S.C. 154(b) by 10 days.

(21) Appl. No.: 16/318,414

(22) PCT Filed: Jul. 7, 2017

(86) PCT No.: PCT/IB2017/054096
§ 371 (c)(1),
(2) Date: Jan. 17, 2019

(87) PCT Pub. No.: WO2018/015834
PCT Pub. Date: Jan. 25, 2018

(65) Prior Publication Data
US 2019/0291311 A1 Sep. 26, 2019

(30) Foreign Application Priority Data
Jul. 20, 2016 (IT) .................. 102016000076240

(51) Int. Cl.
B29C 33/02 (2006.01)
B29C 33/04 (2006.01)
(Continued)

(52) U.S. Cl.
CPC ............ *B29C 43/361* (2013.01); *B29C 33/04* (2013.01); *B29C 33/10* (2013.01); *B29C 43/027* (2013.01);
(Continued)

(58) Field of Classification Search
CPC ..... B29C 33/02; B29C 43/361; B29C 43/027; B29C 2043/029; B29C 33/04; B29C 33/048
See application file for complete search history.

(56) References Cited

U.S. PATENT DOCUMENTS 2,865,052 A 12/1958 Wilcox
4,274,822 A 6/1981 Tamai et al.
(Continued)

FOREIGN PATENT DOCUMENTS

CN 203171963 U 9/2013
CN 103085236 B 3/2015
(Continued)

OTHER PUBLICATIONS

Dr Betz GmbH: "MECOBOND, Der Quantensprung in der Kuhlung and Temperierung von Dauerfromen fur Konststoff-Spritzguss," Aug. 30, 2004, pp. 1-4; XP002339041.
(Continued)

*Primary Examiner* — Joseph S Del Sole
*Assistant Examiner* — Thu Khanh T Nguyen
(74) *Attorney, Agent, or Firm* — Laubscher & Laubscher, P.C.

(57) ABSTRACT

A punch for the compression molding of plastic material for forming capsules for containers closure, wherein the punch includes a stem portion made of steel and a head portion made of copper alloy screwed to the stem portion, wherein a separation interface between the stem portion and head portion includes a passage for gas that reaches a bottom surface of the punch delimitating one forming cavity where the compression molding of the plastic material occurs, and wherein one channel internal to the head portion communicates with the passage for gas to enable extraction of gas out of the forming cavity.

20 Claims, 3 Drawing Sheets

(51) Int. Cl.
- *B29C 45/73* (2006.01)
- *B29C 43/36* (2006.01)
- *B29C 43/02* (2006.01)
- *B29C 33/10* (2006.01)
- *B29L 31/56* (2006.01)
- *B29C 43/50* (2006.01)

(52) U.S. Cl.
CPC ............ *B29C 43/36* (2013.01); *B29C 43/50* (2013.01); *B29C 2043/029* (2013.01); *B29C 2043/5053* (2013.01); *B29L 2031/56* (2013.01)

(56) References Cited

U.S. PATENT DOCUMENTS

| | | |
|---|---|---|
| 4,660,801 A | 4/1987 | Schad |
| 5,061,168 A | 10/1991 | Fox |
| 5,786,079 A | 7/1998 | Alieri |
| 5,800,764 A | 9/1998 | Smeyak et al. |
| 6,736,628 B1 | 5/2004 | Zuffa |
| 6,767,201 B2 | 7/2004 | Zuffa |
| 7,429,170 B2 | 9/2008 | Rote et al. |
| 8,312,612 B2 * | 11/2012 | Gakovic ............... B30B 15/065 425/355 |
| 10,300,633 B2 * | 5/2019 | Penazzi .................. B29C 33/04 |
| 2008/0087627 A1 | 4/2008 | Zuffa et al. |
| 2014/0035194 A1 | 2/2014 | Barnes |

FOREIGN PATENT DOCUMENTS

| | | |
|---|---|---|
| JP | H0261616 U | 5/1990 |
| RU | 2279978 C2 | 7/2006 |
| RU | 2412808 C2 | 2/2011 |
| RU | 2423232 C2 | 7/2011 |
| WO | 2007055820 A1 | 5/2007 |

OTHER PUBLICATIONS

Cremer, M, et al, "Coatings in polymer processing. CrxN coating producted by PVD-magnetron sputtering (MSPVD) open new possibilities in field of wear protection for polymer plasticization units," Materialwissenschaft und werkstofftech, Wiley—VCH Verlag GmbH & Co. KGAA, DE, vol. 29, No. 9, Jan. 1, 1998, pp. 555-561, XP00801947.

* cited by examiner

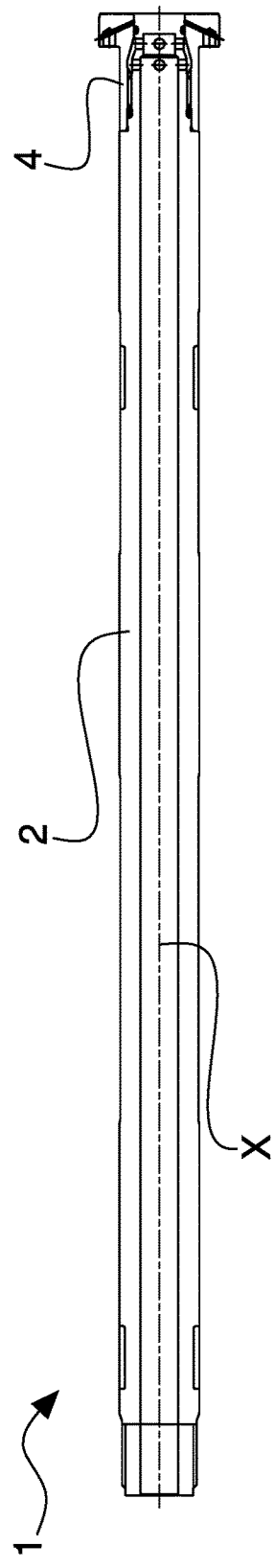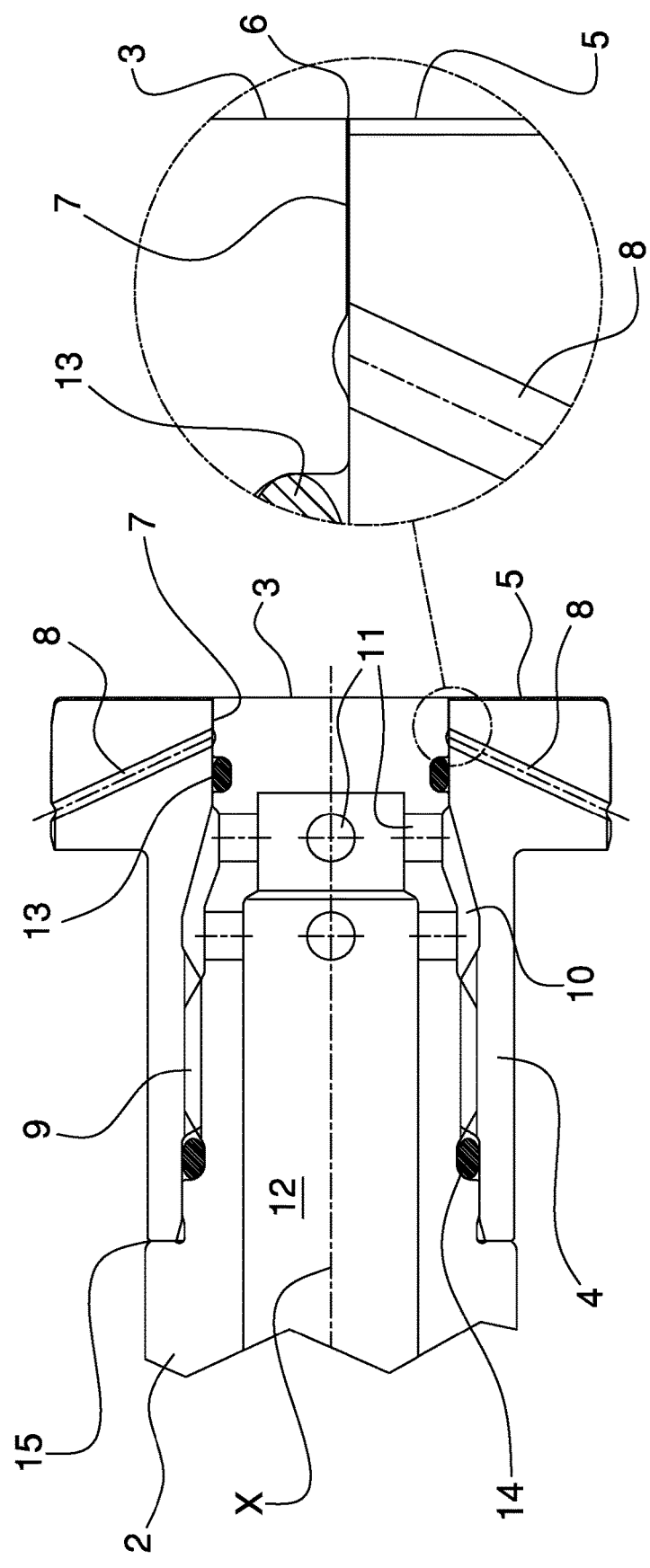

PUNCH FOR COMPRESSION MOLDS

CROSS-REFERENCE TO RELATED APPLICATIONS

This application is a § 371 National Stage Entry of PCT/IB2017/054096 filed Jul. 7, 2017. PCT/IB2017/054096 claims priority of IT102016000076240 filed Jul. 20, 2016. The entire content of these applications are incorporated herein by reference.

BACKGROUND OF THE INVENTION

The invention relates to a punch for compression molds, in particular for compression molding doses of plastic material.

The invention may be applied, specifically but without limitation, for forming capsules for containers closure.

The prior art comprises Patent Publications CN 103085236 B and CN 203171963 U that show one compression mold for containers capsules, with a punch made of various parts among which a cooling water core connected to a threaded core, one pushing tube inside the cooling water core and an inner core mounted inside the pushing tube.

Patent Publication U.S. Pat. No. 4,660,801 shows one mold with a gas expulsion channel formed at the interface between two punch portions to expel gas at the peripheral surface of the mold core.

Patent Publication U.S. Pat. No. 6,736,628 discloses a compression molding carousel for the production of plastic caps, comprising a plurality of molds each of which is equipped with a male half-mold which has a punch provided with compressed air that, outflowing through fluid passage ports, causes the detachment of the cap from the punch and eases the cap removal.

Patent Publication U.S. Pat. No. 5,786,079 discloses a compression molding carousel with punches provided with a cooling circuit.

Patent Publication U.S. Pat. No. 4,274,822 discloses a punch according to the preamble of claim 1.

The known compression molding technology of doses of plastic material can be improved for various aspects. In the first place it is desirable to implement one mold able to improve the quality of the molded product enhancing the efficacy of gas discharge from the forming cavity during the material compression. In the second place is desirable an enhancement of the performances of the eventual process gas injection inside the forming cavity, during one or more compression molding steps of the material. The quality of the molded product may as well be improved by refining the quality of the mold cooling.

SUMMARY OF THE INVENTION

An object of the invention is providing a punch able to overcome one or more of the aforesaid limits and drawbacks of the prior art.

An advantage is implementing a punch for compression molds through which it is possible to ensure high efficiency in gas discharge from the forming cavity during the compression of the material.

An advantage is enabling an optimal process gas injection inside the forming cavity where the molding of the material occurs.

An advantage is making available one relatively cheap punch, in particular as far as the cost of the material is concerned.

An advantage is obtaining one compression mold by means of a relatively simple and cheap manufacturing process.

An advantage is providing a punch with high mechanical resistance, for example a high resistance to wear and rupture (in particular compression and/or traction and/or flexion and/or torsion rupture and/or shear stress).

An advantage is implementing one compression punch with a relatively high stiffness and, therefore, particularly suitable for molding pieces wherein it is required high precision in shape and size.

An advantage is ensuring a precise and efficient molding of pieces (capsules for containers closure) comprising a particularly thin wall (in particular one bottom wall, for example a capsule panel).

An advantage is implementing a compression punch constructively simple and cheap to manufacture.

An advantage is coating the surfaces of the punch with at least one coating material layer through a simple and cheap process.

An advantage is reducing construction time and costs of a compression forming punch that may comprise at least one part of standard size and at least another part depending on the size of the piece to be formed.

An advantage is implementing a punch made of more parts, wherein one part intended for compression, in contact with the forming material, can be made of a material other than the rest of the punch, according to the shape and/or to the dimensions of the piece to be formed and/or according to cooling specific needs.

An advantage is differentiating in a simple way the properties of two different punch portions (stem portion and head portion), in particular applying different coatings in order to adapt the various portions to various functions, for example with one first coating adapted to provide the stem portion with greater resistance (to wear and/or to scratch and/or to load) and with a second coating adapted to provide the head portion with a high in capacity of extraction out of the mold.

An advantage is simplifying and facilitating the replacement of a damaged portion of the punch without replacing the rest of the punch.

Such objects and advantages and others more are achieved by one punch and/or one mold according to one or more of the hereinafter related claims.

In one example, one punch for the compression molding, in particular for compression forming plastic material, comprises a stem portion, a head portion that is coupled (e.g. screwed) to said stem portion, a separation interface between said stem and head portions, a gas passage arranged in said interface to reach a punch bottom surface which delimits one forming cavity where the compression molding of the material occurs, and at least one channel arranged inside said head portion to communicate with said the gas passage such as to enable to extract/introduce gas through the aforesaid punch bottom surface.

The aforesaid channel may flow, in particular, into a lateral peripheral surface of the head portion that may, at least partly, expand in one direction substantially parallel to one longitudinal axis of the punch.

The aforesaid bottom surface may extend, in particular, transversally to a longitudinal axis of the punch. The aforesaid bottom surface may face, for example, outwardly in one direction that is substantially parallel to a longitudinal axis of the punch. The aforesaid bottom surface may be suitable, in particular, to delimit one portion of the forming cavity where a bottom wall of the molded piece (capsule for the containers closure) is formed.

The aforesaid gas passage may flow into one internal (central) zone of the bottom surface which is far from the peripheral edge of the bottom surface. Such inner area of the bottom surface, where the aforesaid gas passage outflows, may be found in one intermediate zone between a peripheral edge of the bottom surface and a central longitudinal axis of the punch, in other words at a certain radial distance from the peripheral edge of the bottom surface and at a certain radial distance from the longitudinal axis, where the term radial is to be intended as referred to the longitudinal axis.

BRIEF DESCRIPTION OF THE DRAWINGS

The invention shall be better understood and implemented referring to the enclosed drawings showing an exemplary non-limiting embodiment, wherein:

FIG. 1 is a longitudinal section of one embodiment of a punch implemented according to the present invention;

FIG. 2 is an enlarged detail of FIG. 1;

DETAILED DESCRIPTION

Figure 3:
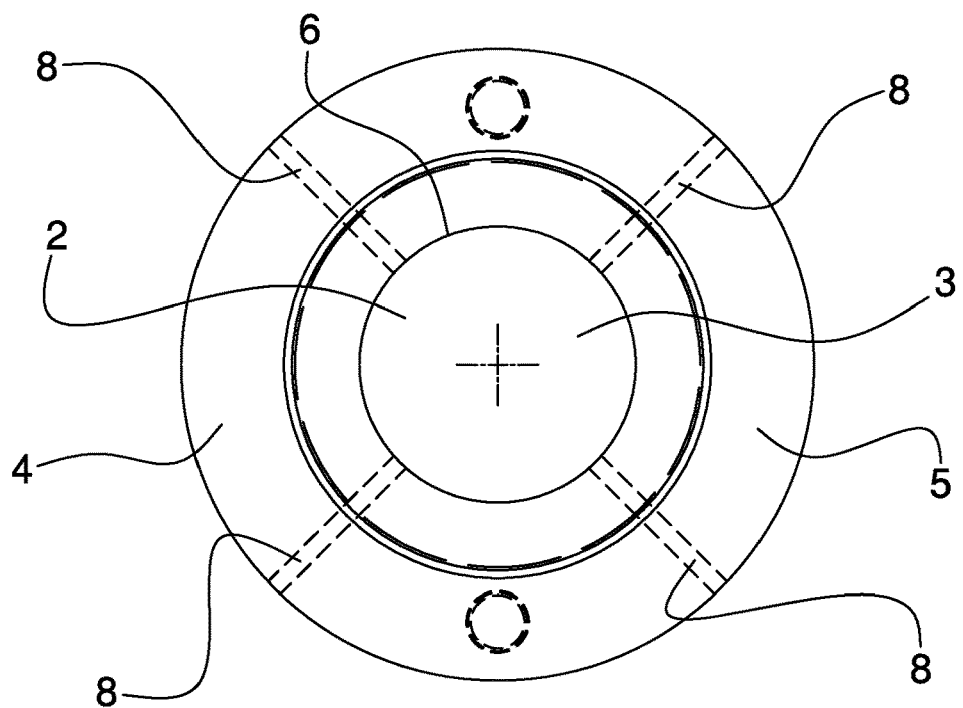
FIG. 3 is a view from the right of FIG. 2.
Figure 4:
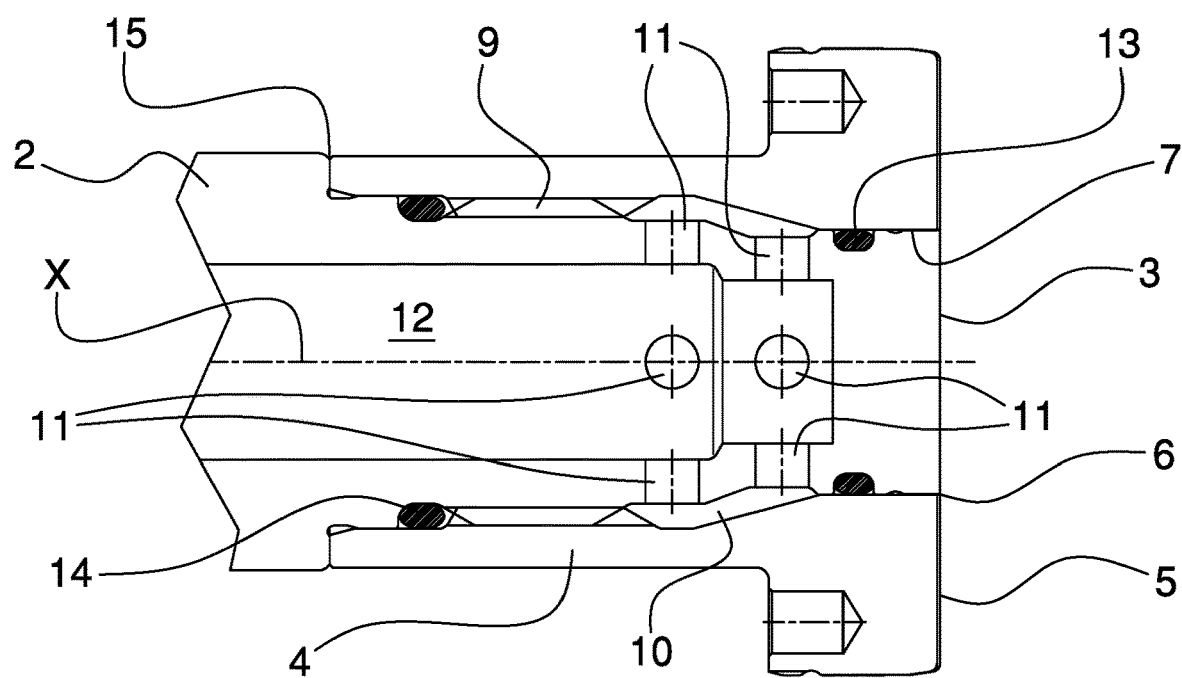
FIG. 4 is the detail of FIG. 2 in one different section.

By 1 it is indicated as a whole a punch for compression forming at least one dose of (plastic) material. The punch 1 may be used, in particular, in a molding unit for compression forming plastic capsules for containers closure. The punch 1 may be intended, in particular, to cooperate with a die for defining one forming cavity of one mold wherein introducing at least one dose of plastic material to be formed.

The punch 1 may comprise, in particular, at least one stem portion 2 comprising a longitudinal axis X. The longitudinal axis X may substantially correspond with the compression axis with which the molding unit will exert the compression action for forming the object.

The stem portion 2 may comprise, as in this example, one first surface portion 3 (e.g. circular-shaped). The first portion of surface 3 may be, in particular, at least partly transverse (perpendicular) to the longitudinal axis X. The first surface portion 3 may be configured and arranged for the compression contact with the material (e.g. the plastic material) during the compression step in the forming cavity.

The punch 1 may comprise, in particular, at least one head portion 4 coupled with the stem portion 2. The head portion 4 may comprise, as in this example, one second surface portion 5 (e.g. circular crown-shaped). The second surface portion 5 may be in particular, at least partly transverse (perpendicular) to the longitudinal axis X. The second surface portion 5 may be, as in this example, (externally) contiguous to the first surface portion 3. The second surface portion 5 may be configured and arranged for the compression contact with the material (e.g. the plastic material) during the compression step in the forming cavity.

The punch 1 may comprise, in particular, at least one separation interface between the stem portion 2 and the head portion 4. The interface between the stem portion 2 and the head portion 4 (stem-head interface) may comprise, as in this example, at least one boundary line 6 dividing the first surface portion 3 from the second surface portion 5. Gas passage 7 may in particular be arranged at the stem-head interface, for example one or more interstices or cavities suitable for the gas passage. Gas passage 7 may reach in particular the boundary line 6 between the aforesaid surfaces 3 and 5.

Gas passage 7 (venting) may comprise, for example, a narrow hollow space which, at the boundary line 6 or beside it, may have a maximum width of about 0.01-0.02 millimetres, for example a maximum width not greater than 0.02 millimetres, or 0.05 millimetres, or 0.10 millimetres, or 0.15 millimetres, or 0.20 millimetres. The aforesaid hollow space of the gas passage 7 may have various shapes, for example more or less numerous facets, or a diameter reduction, or still other shapes. The aforesaid width may be uniform along the whole hollow space (for example until a wider annular recess that may face a channel 8, as in this case), or it may grow, a few millimetres after the boundary line 6 in particular for as much as it is necessary to prevent molten plastic to rise back along the hollow space of the gas passage 7.

In particular, the punch 1 may comprise at least one channel 8 internal to the head portion 4. In this specific case four channels 8, that are arranged angularly spaced apart of 90°, are provided. Each channel 8 may be, as in this example, communicating with the gas passage 7 to allow to extract gas out of (and/or introduce gas into) a space delimited by the aforesaid first and second surface portions 3 and 5. In particular, such space may be comprised in the forming cavity where, in use, the compression molding of the plastic material occurs.

Gas passage 7 may for example comprise a single passage aperture at the boundary line 6. Gas passage 7 may for example comprise a plurality of apertures angularly spaced apart one another at the boundary line 6.

Gas passage 7 may comprise, at the interface zones other than the boundary line 6, a single annular-shaped passage. Gas passage 7 may comprise, at the interface zones other than the boundary line 6, a series of passages communicating with channel/s 8. Gas passage 7 may comprise, at the interface zones other than the boundary line 6, a single annular-shaped passage contiguous to the boundary line 6 and communicating with a series of passages in turn communicating with channel/s 8.

The first surface portion 3 (circular) may be, as in this case, surrounded all around by the second surface portion 5 (circular crown). In particular, the boundary line 6 may have closed annular (circular) shape.

The interface between the stem portion 2 and the head portion 4 may be, at least partly, expanded in the direction of the longitudinal axis X.

The head portion 4 may be, as in this example, coupled with the stem portion 2 by means of a removable coupling, in particular by means of screw coupling 9.

In particular, the punch 1 may comprise at least one cooling circuit at least partially arranged inside the stem portion 2.

The cooling circuit may comprise, as in this case, at least one gap 10 arranged at the stem-head interface so that at least one part of the cooling circuit contacts the head portion 4.

In particular, the cooling circuit may comprise at least two fluid passages 11 (at least one inlet passage and at least one outlet passage) obtained in one wall of the stem portion 2 for the circulation of the fluid through the aforesaid cooling gap 10. The cooling circuit may also comprise an arrangement for conveying the cooling fluid to the fluid inlet passage/s 11 and an arrangement for returning the cooling fluid from the fluid outlet passage/s 11. In particular, such conveying and returning arrangement may be arranged inside one longitudinal cavity 12 obtained in the stem portion 2. In particular, such conveying and returning arrangement may comprise one or more, not shown, fluid transport ducts (for example of the known type).

In particular the punch 1 may comprise a first sealing element 13 arranged on the stem-head interface for sealingly isolating the aforesaid gas passage 7 with respect to the aforesaid cooling gap 10. The first sealing element 13 may comprise, as in this example, at least one sealing ring (O-ring).

In particular the punch 1 may comprise a second sealing element 14 arranged on the stem-head interface between the cooling gap 10 and an edge 15 of the aforesaid interface disposed at an interface end opposite to an end where the boundary line 6 is placed. In particular such end edge 15 of the interface may comprise, in particular, an annular-shaped edge (for example at least partially circular, in particular circular with the centre in the axis X). The second sealing element 14 may comprise, as in this example, at least one sealing ring (O-ring).

Each channel 8 may comprise, as in this case, at least one channel part that is oblique with respect to the longitudinal axis X. In particular, each channel 8 may connect the gas passage 7 with a lateral peripheral surface of the head portion 4 of the punch. In particular, such lateral peripheral surface where the channel 8 flows into may comprise one external lateral surface (cylindrical) extending at least partly in the longitudinal axis X direction.

In particular the stem portion 2 and the head portion 4 may be made of two at least partly different materials. One material (e.g. steel) of the stem portion 2 may have for example a thermal conductivity lower than a material (for example a copper alloy or another type of steel) of the head portion 4. In this configuration it is possible to facilitate the obtaining of a desired thermal conditioning of the plastic material that undergoes the compression in the forming cavity.

In particular, a material of the stem portion 2 may have a greater mechanical resistance (in particular resistance to wear and/or resistance to traction rupture and/or resistance to compression rupture) than a material of the head portion 4. In this configuration it is possible to obtain a proper compression action of the plastic material in the forming cavity and, at the same time, a high resistance and duration of the punch 1.

The first surface portion 3 may be coated with a first coating. The second surface portion 5 may be coated with a second coating. The second coating (on the head portion 4) may have at least one chemical-physical property different from the first coating (on the stem portion 2). It is possible that only one surface portion (the first 3 or the second 4) is coated with a coating, or both, or none of them.

The first coating and/or the second coating may be made by vacuum deposition of thin film, for example by physical vapour deposition (PVD) and/or by plasma assisted chemical vapour deposition (PACVD), or by other techniques known for implementing coatings (e.g. thin film), also eventually techniques of the multilayer type.

In particular the first coating may extend on the lateral surface of the stem portion 2 contiguous to the first surface portion 3. The second coating may extend, in particular, on the lateral surface/s of the head portion 4 contiguous to the second surface portion 5.

The second coating (on the second surface portion 5 in the head portion 4) may comprise at least one layer of low friction coefficient. In particular, the second coating may have a determined detaching or anti-adhesion capacity from the plastic material, for example a detaching or an anti-adhesion capacity from plastic material greater than the first coating (on the first surface portion 3 in the stem portion 2). It is provided that the second coating may not cover at least one part of the surface (or the whole surface) of the head portion 4 arranged in the stem-head interface. The second coating may for example comprise one or more layers of carbon-based coating material, for example a DLC coating.

The first coating (on the first surface portion 3) may comprise for example, one or more layers of high tribological-properties coating material/s. In particular the first coating may have a determined resistance to wear than the second coating (on the second surface portion 5), for example a resistance to wear greater than the second coating. It is provided that the first coating may not cover at least one part of the surface (or the whole surface) of the stem portion 2 arranged in the stem-head interface. The first coating may comprise, for example, one material and/or more materials used to carry out coatings of the known type.

An example of a working cycle for manufacturing the punch may comprise the following working steps. One first step comprises the implementation of the stem portion 2 and of the head portion 4 as two separate semi-finished pieces. One second step comprises the assembling (screwing) of the two semi-finished pieces. One third step comprises a finishing processing of the assembling of the two pieces, put together, so as to ensure the concentricity of the set formed by the two pieces. One fourth step comprises the de-assembling (unscrewing) of the two pieces. One fifth step comprises the coating execution of the two pieces (separately). One sixth step comprises a new assembling of the two coated pieces (in particular inserting sealing elements 13 and 14).

Figure 6:
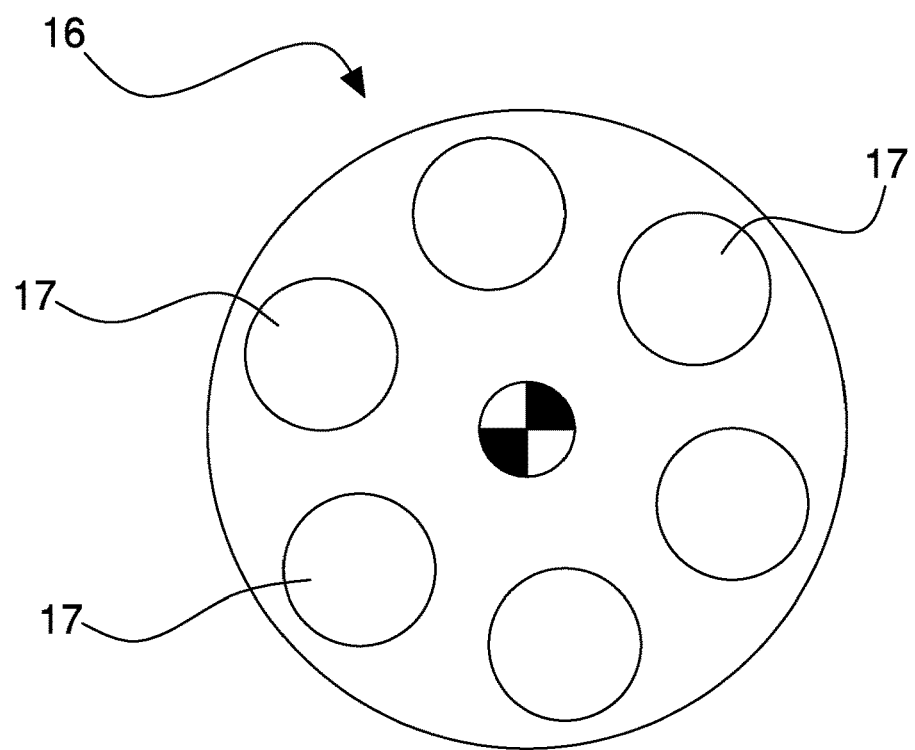
FIG. 6 is a schematic view from above of a molding carousel that comprises a plurality of molding units as the one in FIG. 5.
Figure 5:
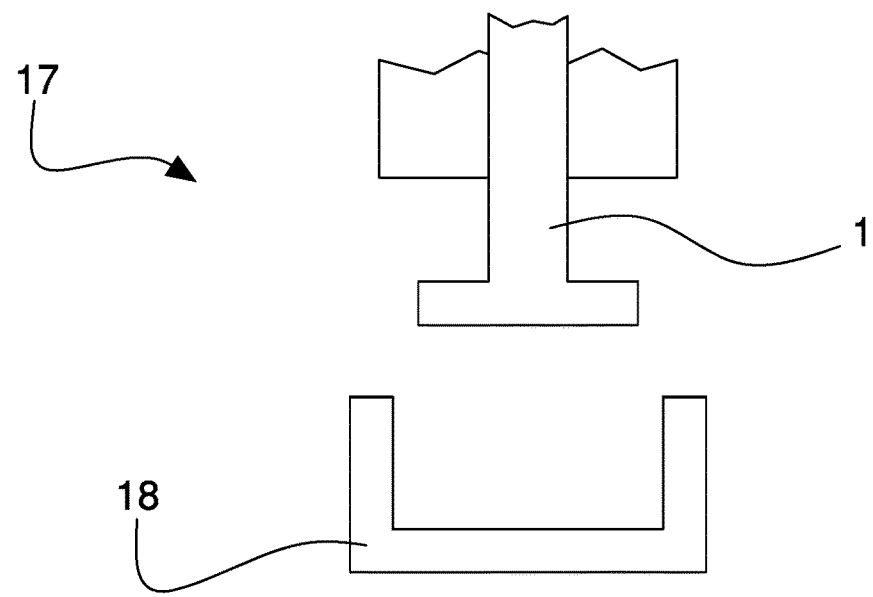
FIG. 5 is a schematic vertical elevation view of one compression molding unit of plastic material comprising the punch of FIG. 1.

Referring to FIGS. 5 and 6, the above described punch 1 may be used in a device for compression forming plastic material comprising at least one rotating molding carousel 16, comprising in turn a plurality of molding units 17. The molding carousel 16 carries the various molding units 17 being angularly spaced apart from each other. One or more of the molding units 17 of the aforesaid forming device may comprise, each one of them, at least one punch 1 made as previously described. The molding unit 17 may comprise one die 18 operatively coupled with the punch 1. In particular each molding unit may be configured for compression forming closures (capsules) for containers.

In particular, the aforesaid device for compression forming plastic material may comprise one carousel device equipped with a moulding unit as the one disclosed in Patent Publication U.S. Pat. No. 6,736,628 (herein enclosed by reference in the present description), wherein the punch 13 described in U.S. Pat. No. 6,736,628 is replaced by the previously described punch 1.

The above described punch 1 ensures a high efficiency as for gas discharge from the forming cavity during the compression of the material, in particular due to the fact that gas discharge can occur through gas passage 7 that is arranged in a substantially central zone of the active bottom surface (the surface in contact with plastic material during the compression step) of the punch 1, that is in a central zone of the forming cavity where the compression of the material takes place.

It if further allowed an optimal process gas injection inside the forming cavity where the molded product is formed, in particular due to the fact that, in this case as well, gas introduction can occur through the gas passage 7 arranged in a central zone of the active surface of the punch 1.

The punch is relatively cheap, especially because the stem portion 2 may be made in cheaper material (e.g. steel) with respect to the material (e.g. copper alloy) of the head portion 4, as the stem portion 2 can take part in the cooling function at a lesser extent than the head portion 4.

The compression punch 1 may be made through a relatively simple and cheap manufacturing process. In particular, the conformation and the sizes of the stem portion 2 may be standardized, as they may not strictly depend on the shape of the product to be molded, thus reducing manufacturing costs and time.

The punch 1 may show a high mechanical resistance (resistance to wear and/or traction and/or flexion and/or torsion and/or shear stress), as the stem portion 2, which takes part in the cooling of the system in a relatively less important way than the head portion 4, may be made of a material (e.g. steel) that specifically has high mechanical properties rather than thermal properties. Furthermore, the stem portion 2 may be structured to make a compression punch with a relatively high stiffness and therefore able to mold pieces with high shape and size accuracy. In particular this allows to guarantee a precise and efficient molding of pieces comprising a particularly thin bottom wall, as for example, a thin panel of a capsule for the closure of containers.

As seen, it is possible to coat in a differentiated way at least two different punch portions (stem portion 2 and head portion 4), in particular applying different coatings for adapting the various portions to different functionalities, for example providing the stem portion 2 with greater resistance (anti-wear and/or anti-scratch coating) and providing the head portion 4 with a high capacity of extraction out of the mold (anti-adherence and/or anti-friction coating).

The invention claimed is:

1. A punch for compression forming at least one dose of plastic material, said punch comprising:
   (a) at least one stem portion including a longitudinal axis and a first surface portion that is transverse to said longitudinal axis; said first surface portion being configured and arranged for the compression contact with the plastic material;
   (b) at least one head portion coupled with said stem portion, said head portion including a second surface portion that is transverse to said longitudinal axis and contiguous to said first surface portion, said portion being configured and arranged for compression contact with the plastic material;
   (c) at least one separation interface between said stem portion and said head portion, said interface including at least one boundary line between said first and second surface portions, said interface including a gas passage that extends to said boundary line;
   (d) at least one channel that is internal to said head portion and that communicates with said gas passage to extract and/or introduce gas into a space delimited by said first and second surface portions where the compression molding of the plastic material occurs; and
   (e) a cooling circuit at least partly arranged inside said stem portion;
   wherein said cooling circuit includes at least one gap arranged in said interface so that the fluid circulating cooling circuit is in contact with said head portion, and wherein said punch comprises a first sealing element arranged on said interface to isolate said gas passage with respect to said cooling gap.

2. A punch according to claim 1, wherein said cooling circuit comprises at least two fluid passages formed in a wall of said stem portion for the circulation of fluid through said gap.

3. A punch according to claim 1, comprising a second sealing element arranged on said interface between said cooling gap and an edge of said interface that is located opposite to said boundary line.

4. A punch according to claim 1, wherein said channel is at least partly oblique with respect to said longitudinal axis.

5. A punch according to claim 4, wherein said first surface portion is surrounded all around by said second surface portion, said boundary line being of closed annular shape.

6. A punch according, to claim 4, wherein said interface is at least paneled in the direction of said longitudinal axis.

7. A punch according to claim 1, wherein said gas passage comprises at least one passage opening arranged at said boundary line, said passage opening having a maximum width not greater than 0.02 millimetres, or 0.05 millimetres, or 0.10 millimetres, or 0.15 millimetres, or 0.20 millimetres.

8. A punch according to claim 1, wherein said head portion is coupled with said stem portion by a screw coupling.

9. A punch according to claim 1, wherein said cooling circuit comprises at least one gap arranged in said interface in a manner that the fluid circulating in said cooling circuit is in contact with said head portion.

10. A punch according to claim 9, wherein said cooling circuit comprises at least two fluid passages formed in a wall of said stem portion for the circulation of fluid through said gap.

11. A punch according to claim 1, wherein said Channel connects said gas passage with a peripheral lateral surface of said head portion.

12. A punch according to claim 1, wherein said first surface portion is coated with a first coating and said second surface portion is coated with a second coating having at least one chemical-physical property that is different with respect to said first coating.

13. A punch according to claim 12, wherein said second coating has a greater capacity for at least one of detachment and anti-adhesion from the plastic material than said first coating.

14. A punch according to claim 12, wherein said first coating has a higher wear resistance than said second coating.

15. A plastic material compression forming device comprising at least one molding carousel including a plurality of molding units, each molding unit including at least one punch made according to claim 1.

16. The device according to claim 15, wherein each molding, unit is configured for forming closures for containers.

17. A punch for compression forming at least one dose of plastic material, said punch comprising:
   (a) at least one stem portion including a longitudinal axis and a first surface portion that is transverse to said longitudinal axis, said first surface portion being configured and arranged for compression contact with the plastic material;
   (b) at least one head portion coupled with said stem portion, said head portion including a second surface portion that is transverse to said longitudinal axis and contiguous to said first surface portion, said second surface portion being configured and arranged for compression contact with the plastic material;
(c) at least one separation interface between said stem portion and said head portion, said interface including at least one boundary line between said first and second surface portions, said interface including a gas passage that extends to said boundary line; and
(d) at least one channel that is internal to said head portion and that communicates with said gas passage to extract and/or introduce gas into a space delimited by said first and second surface portions where the compression molding of the plastic material occurs;
wherein said stem portion and said head portion are made of two different materials.

18. A punch according to claim 17, wherein a material of said stem portion has a lower thermal conductivity than a material of said head portion.

19. A punch according to claim 17, wherein a material of said stem portion has at least one of a greater mechanical resistance and a greater stiffness than a material of said head portion.

20. A punch according to claim 17, wherein said channel is at least partly oblique with respect to said longitudinal axis.

* * * * *